March 12, 1968  W. H. ZIMMER  3,372,530
AIR CLEANER
Filed March 21, 1966

INVENTOR.
WALTER H. ZIMMER
BY
HIS ATTORNEYS

United States Patent Office 3,372,530
Patented Mar. 12, 1968

3,372,530
AIR CLEANER
Walter H. Zimmer, Galesburg, Ill., assignor to Antipol Corporation, Galesburg, Ill., a corporation of Illinois
Filed Mar. 21, 1966, Ser. No. 536,018
3 Claims. (Cl. 55—257)

ABSTRACT OF THE DISCLOSURE

A water spray diverges downstream from a spray nozzle located at the longitudinal centerline of a duct to wet a stream of air carrying particles in the duct. A rectangular frame having knife edges at its outer periphery surrounds the spray nozzle and the inner walls of the duct downstream from the rectangular frame are washed by another water spray from a circular conduit located immediately downstream from the frame. The wetted air is cleaned by a precipitator panel and dried upon expansion in a settling chamber and by passing through a demister panel. The water and particles are collected by a bin adjacent the settling chamber.

---

This invention relates to an air cleaner or scrubber and more particularly to an improved air scrubber design in which buildup at the wet-dry line is substantially eliminated.

In previously known air scrubbing devices relatively dry air, which is to be cleaned by removal of dust carried thereby, is introduced into a duct in which the air is scrubbed by contacting the air with water in the form of a mist or spray. The introduction of water droplets into the air stream has a decelerating effect on the air stream in that a portion of the energy in the air stream is transferred to the water droplets, thus accelerating the water droplets in the direction of the air stream.

Without purporting to understand the phenomena encountered, the introduction of the water droplets into the air stream appears to sufficiently decelerate the air stream that a drag or back pressure develops just upstream of the point at which the water spray is introduced. This deceleration of the air stream causes the air to lose some of its ability to carry dust particles with the result that dust particles are deposited in the duct just upstream of the water spray. The point within the duct at which the deposit occurs is referred to as the wet-dry line since this is the point at which the relatively dry incoming air encounters the water spray and becomes relatively moist air.

Unless the air scrubbers of the previously known type are periodically cleaned so as to remove the dust buildup at the wet-dry line, the duct which receives the air to be scrubbed or cleaned is gradually pinched off by the dust buildup with the result that the cleaning efficiency of the air scrubber rapidly diminishes.

An object of the present invention is to provide an improved air scrubber design in which the above described dust buildup at the wet-dry line is substantially eliminated.

Another object of the present invention is to provide an improved means for continuously cleaning the duct in which the wet-dry line occurs.

Other objects and advantages reside in the construction of parts, the combination thereof, the method of manufacture and the mode of operation, as will become more apparent from the following description.

Referring to the drawing.

Figure 1:
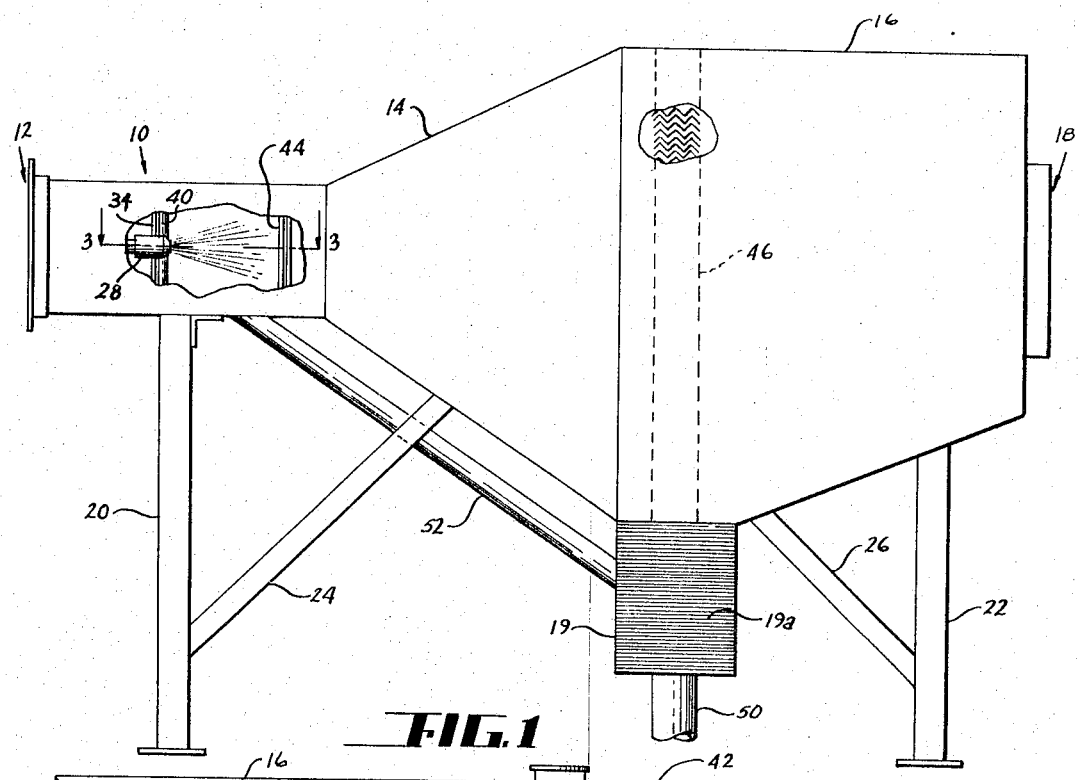
FIGURE 1 is a fragmentary side elevation view of an air scrubber embodying the present invention with portions broken away to reveal interior detail.

The scrubber illustrated in the drawing includes a duct 10 having a reinforced inlet opening 12 adapted for attachment to the outlet of the system generating the air to be scrubbed. Such system may comprise a coal cleaning or drying plant, a feed mill, a smelting or steel making plant or any other type of operation generating dust or fumes which are desirably kept out of the ambient atmosphere.

The duct 10 discharges to a divergent settling chamber or duct 14 which, in turn, connects to a chamber 16 having an outlet opening 18.

Figure 2:
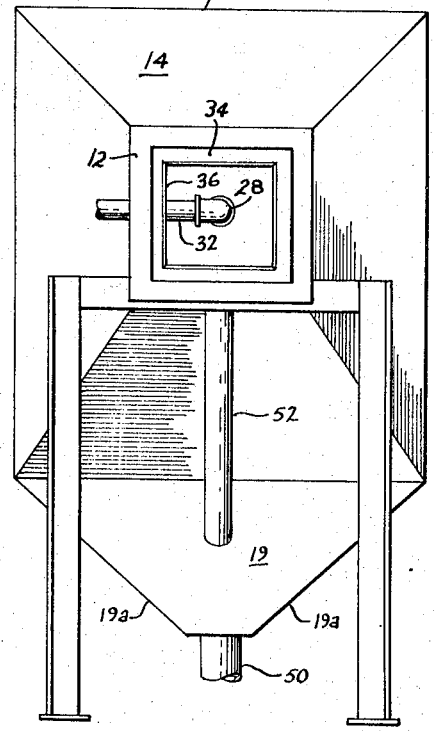
FIGURE 2 is a fragmentary end elevation view of the air scrubber of FIGURE 1.

The chambers 14 and 16 have inclined floors which slope in the direction of a collection bin 19 having converging side walls 19a, best seen in FIGURE 2. The collection bin directs material flowing out of the settling chamber to an outlet drain 50.

The assembly of the duct 10 with the chambers 14 and 16 is supported by a suitable frame including uprights 20 and 22 and braces 24 and 26. The scrubber assembly is supported so that the air flow from the inlet opening 12 to the outlet opening 18 is substantially horizontal.

Mounted centrally within the duct 10 is a spray nozzle 28 having an outlet orifice 30 facing downstream of the duct. The spray nozzle 28 receives water, or any other suitable air scrubbing liquid, from an inlet pipe 32 which extends horizontally into the duct 10 to approximately the central axis thereof. The nozzle 28 injects a divergent stream or spray of water droplets into the duct 10 in the downstream direction.

Positioned a short distance upstream of the outlet orifice 30 is a rectangular frame or baffle 34 fitted within the duct 10 in encircling relation to the nozzle 28. The outer periphery of the frame 34 is welded or otherwise fixedly secured to the interior wall of the duct 10 with the result that all air passing through the duct 10 is forced to flow through the opening defined by the inner periphery of the frame 34.

The inner periphery of the frame 34 is beveled as at 36 to provide the baffle with a knife edged inner periphery. The knife edge at the inner periphery of the frame 34 prevents a buildup of dust and/or water at the inner periphery of the baffle 34.

As clearly appears in FIGURE 2, the baffle 34 constricts the opening of the duct 10 approximately equally along all four of the interior side walls of the duct 10 and represents the smallest opening or constriction in the duct 10 upstream of the spray nozzle.

Located adjacent the downstream side of the baffle 34 is an annular pipe or conduit 40 receiving liquid from the same source as the nozzle 28 by means of a connecting pipe 42. The conduit 40 is of a rectangular shape and has its outer periphery substantially contiguous to the interior wall of the duct 10. The conduit 40 may be welded or otherwise fixed to the interior wall of the duct 10.

The conduit 40, which is circular in cross section, has a plurality of spaced openings or pores located in the downstream side of its outer wall. These openings are all placed approximately 30° around the circular periphery of the conduit 40 from the point at which the conduit contacts the interior wall of the duct 10. The pores are also each radially disposed with respect to the central axis of the conduit 40 with the result that each pore 38 releases a jet of liquid in a direction which is downstream with respect to the direction of air flow through the duct 10 and which makes an angle of approximately 60° with the interior wall of the duct 10.

The pores 38 are preferably closely spaced along the length of the conduit 40 so as to provide an annular curtain of liquid spray directed toward the interior wall surfaces of the duct 10 and directed downstream of the duct 10. This curtain of liquid spray may be referred to as a secondary spray, the nozzle 28 providing the primary spray.

Figure 3:
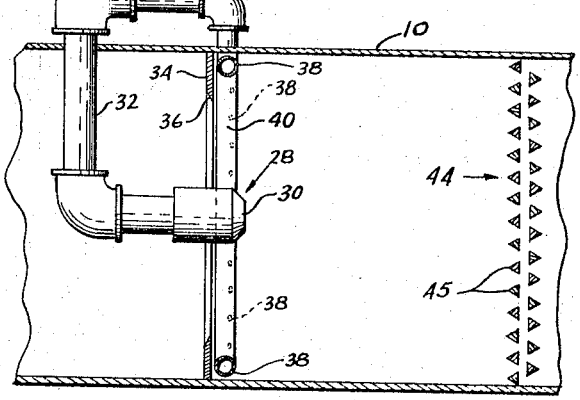
FIGURE 3 is a fragmentary enlarged section view taken substantially on the line 3—3 of FIGURE 1.

As clearly shown in FIGURE 3 the conduit 40 is disposed in a plane which is slightly upstream of the orifice 30 for the nozzle. Considering that the orifice 30 approximately establishes the previously described wet-dry line, the curtain of liquid released from the conduit 40 approximately encircles the wet-dry line. As also appears in FIGURE 3, the conduit 40 lies radially outside the axial projection of the inner periphery of the baffle 34. The baffle 34 thus shields the conduit 40 from the direct force of the gas stream flowing through the duct 10.

The spray emerging from the nozzle 28, being a divergent spray, eventually strikes the interior walls of the duct 10 provided the size of water droplets sprayed from the nozzle 28 and the velocity of these water droplets is sufficient to resist total diversion to the downstream direction.

The water flow through the conduit 40 can be preselected to produce an adequate curtain spray by selection of the proper diameter for the pipe 42 leading to the conduit 40. When the desired water flow is not known in advance of the construction and operation of the air scrubber, throttle valves may be placed in the pipes 42 and 37 to allow an adjustment of the relative water flow between the nozzle 28 and the conduit 40.

At approximately the point where the spray from the nozzle 28 ordinarily strikes the interior wall of the duct 10, or downstream therefrom, a particle precipitator panel 44 partitions the duct 10. Since this panel is at or downstream of the point at which spray from the nozzle 28 can strike the interior walls of the duct 10 all air and other matter passing to the panel 44 has been exposed to the influence of the spray from the nozzle 28.

The particle precipitator panel, which is more fully described in United States patent application Ser. No. 332,822 filed by James R. Sweeney Dec. 23, 1963, comprises two parallel and planar grids of wire elements 45. The wire elements 45 are each of triangular cross section and, in each grid, are arranged in equally spaced parallel relation. As shown, the wires 45 in each grid are staggered with respect to the wires in the adjacent grid such that the gap between each pair of wires in one grid is confronted by a flat base or side of a wire in the adjacent grid, the gaps between wires being narrower in width than the flat bases of the wire elements which confront said gaps. As a result there is no straight through path for the generally horizontal air stream advancing upon panel 44.

Due to the triangular shape of the wire elements 45, the air entering the particle precipitator panel enters convergent slits between the wire elements in the upstream grid. Since the air is thus forced to enter diminishing channels, the air velocity necessarily increases as the air approaches the confronting flat bases of the wire elements in the downstream grid. Any particulate matter carried by the air is thereby caused to impinge upon the bases of the downstream wire elements.

Since such particulate matter will have been moistened by the spray emerging from the nozzle 28, the particulate matter will tend to adhere to the bases of the downstream wire elements and accumulate thereon. As the accumulated masses of moistened particulate matter build up on the downstream grid in the panel 44, the accumulated masses will fall off the panel to the floor of the duct 10 and will be washed by water to the drain 50 in a manner to be subsequently described.

While the wire elements 45 of the particle precipitator panel are shown as disposed vertically in the duct 10 in FIGURE 3, it is to be understood that no particular importance is placed upon the orientation of the wire elements and that the particle precipitator panel will work with equal efficiency when the wire elements 45 are disposed horizontally.

The particle precipitator panel operates with great efficiency and substantially all particulate matter carried into the duct 10 by the air stream is removed by the panel 44. In general, the only matter passing the panel 44 comprises fine particles contacted with moisture droplets and effectively trapped in the moisture. As the air stream enters the settling duct 14, its velocity is greatly reduced due to expanding area of this duct. As the air thus decelerates, most of the moisture droplets being carried by the air stream drop to the floor of the duct 14 and wash down this floor into the collector 19.

To remove any moisture droplets that do not drop out of the air stream in passing through the duct 14, a demister panel 45 partitions the settling chamber 14 at approximately the downstream outlet therefrom. The demister panel comprises a plurality of parallel fins corrugated in an angular fashion so as to provide successive triangular troughs in each. The separation between the fins is less than the depth of the troughs with the result that the bases of the troughs in one fin project into the tops of the troughs of the adjacent fin and with the further result that no straight through horizontal path exists for the air moving through the demister.

The air moving through the demister is of a relatively low velocity due to the large area of the demister. As a consequence even fine moisture droplets carried by the air entering the demister are caused to impinge upon the inclined surfaces of the demister.

The air emerging from the demister 46 and flowing onward to the outlet opening 18, while it ordinarily has a relatively high humidity due to an evaporation of water injected into the air stream at the wet-dry line, will be substantially free of moisture droplets due to the action of the demister. Since substantially all particulate matter passing the particle precipitator panel 44 is trapped in water droplets, substantially all particulate matter that may reach the demister 46 is removed by the demister 46.

While the action of the baffle 34 in eliminating dust buildup at the wet-dry line is not fully understood, it is considered that the baffle has the effect of reducing the area of the duct 10 just upstream of the wet-dry line and thereby accelerating the air stream into the wet-dry line. This enhanced velocity of the air stream at the wet-dry line tends to carry a greater percentage of the particulate matter in the entering air stream into the spray delivered by the nozzle 28. The baffle will, of course, act somewhat as a snow fence such that some of the particulate matter will tend to settle immediately downstream of the baffle. However, the presence of the curtain spray from the conduit 40 assures that any particles settling downstream of the baffle will encounter the curtain spray and will be washed along the interior walls of the duct 10. To the extent, then, that there is a tendency for dust buildup at the wet-dry line, such dust is continuously removed by the curtain spray from the conduit 40.

To facilitate the discharge of the water from the curtain spray, a drain is placed in the floor of the duct 10 intermediate the conduit 40 and the particle precipitator 44, the drain entering a pipe 52 connecting directly to the collection bin 19, and through the bin 19, to the drain 50. The drain to the pipe 52 also aids in removing particulate matter dropping from the particle precipitator 44 since a portion of the water washing from the interior walls of the duct 10 will flow into the pipe 52.

It will be appreciated by those skilled in the art that the location of the wet-dry line must ordinarily be determined empirically. Thus, the location of the wet-dry line is influenced by the velocity of the incoming air, the size distribution of the particles in such air, the nature and velocity of the spray produced by the nozzle 28, and, among other factors, the general configuration of the duct 10. Ordinarily, when the nozzle 28 releases a wide angle divergent spray, the wet-dry line will occur just upstream of the nozzle orifice. However, with other types of spray devices the wet-dry line may occur downstream of the spray orifice.

Although the preferred embodiment of the process has been described, it will be understood that within the purview of this invention various changes may be made in the form, proportion and ingredients and the combination thereof, which generally stated consist in a method and a compound capable of carrying out the objects set forth, as disclosed and defined in the appended claims.

Having thus described my invention, I claim:

1. A scrubbing device for removing particular matter from a gas stream comprising: an elongate horizontally disposed duct having open ends and a central longitudinal axis, one of said open ends being an inlet opening into which said gas stream flows and the other of said open ends being an outlet opening for said gas stream, a source of liquid under pressure; a spray nozzle connected to said source and mounted within said duct, said spray nozzle having an outlet orifice disposed substantially on said axis, said nozzle directing a divergent liquid spray into said gas stream in the downstream direction, said liquid spray moistening the particulate matter in said gas stream; a baffle disposed in said duct between the open ends thereof and substantially upstream of said outlet orifice, said baffle being disposed perpendicular to said longitudinal axis, said baffle having an outer periphery contacting the interior wall of said duct and an inner periphery spaced from said interior wall, said baffle closing said duct except for an opening therethrough defined by said inner periphery; secondary spray means adjacent and downstream of said baffle delivering an annular curtain of liquid spray directed outwardly toward the interior wall of said duct and in a downstream direction, said annular curtain of spray encircling the longitudinal axis of said duct; a particle precipitator panel located in said duct downstream of said nozzle, said panel comprising a first grid of spaced and parallel wire elements traversing said duct and occupying a plane substantially normal to said longitudinal axis and a second grid of spaced and parallel wire elements downstream of said first grid occupying a plane parallel to said first grid, the wire elements of said second grid being parallel to the wire elements of said first grid and confronting the spaces between the wire elements of said first grid; and a drain opening through the wall of said duct, said drain opening being displaced between said secondary spray means and said particle precipitator panel and providing a discharge for liquid from said duct.

2. The device according to claim 1 including further separator means attached to said duct.

3. A scrubbing device for removing particulate matter from a gas stream comprising: an elongate duct of rectangular cross section having open ends and having a substantially horizontal longitudinal axis, one of said open ends being an inlet opening into which said gas stream flows and the other of said open ends being an outlet opening for said gas stream; a source of liquid under pressure; a spray nozzle connected to said source and mounted within said duct, said spray nozzle having an outlet orifice disposed substantially on said axis directing a divergent liquid spray entering into said stream in a downstream direction away from said inlet opening, said liquid spray moistening the particulate matter in said gas stream; a rectangular baffle disposed in said duct substantially perpendicular to the longitudinal axis of said duct, said baffle having an outer periphery contacting the interior wall of said duct and an inner periphery spaced inwardly from said interior wall, said baffle closing said duct except for an opening therethrough defined by said inner periphery, said inner periphery comprising a knife edge, the area of said opening in said baffle being smaller than the cross sectional interior area of said duct at all points along the length of said duct upstream of said baffle; a secondary spray means adjacent said baffle and downstream of said baffle delivering an annular curtain of liquid spray directed outwardly toward the interior wall of said duct and in a downstream direction, said curtain of spray encircling said longitudinal axis of said duct, said secondary spray means including an annular perforate conduit disposed downstream of said baffle and connected to said liquid source, said conduit encircling and lying outside the axially downstream projection of the inner periphery of said baffle; a particle precipitator panel located in said duct downstream from said nozzle; said particle precipitator panel comprising a first grid of spaced and parallel wire elements traversing said duct downstream of said nozzle and occupying a plane substantially normal to said longitudinal axis of said duct, and a second grid of spaced and parallel wire elements downstream of said first grid occupying a plane parallel to said first grid, the wire elements of said second grid being parallel to the wire elements of said first grid and confronting the spaces between the wire elements of said first grid; said device including a drain opening in the vertically lowermost wall of said duct between said secondary spray means and said particle precipitator panel providing a discharge for liquid from said duct; a first settling chamber downstream from said precipitator panel and a second chamber having an air outlet opening downstream of said settling chamber; a collection bin constructed and arranged to receive material from said chambers; a drain pipe connected to and between said drain opening and said collection bin; drain means for discharging material from said collection bin; a demister panel confined by said chambers; and a support structure connected to said duct, said settling chamber and said second chamber for supporting said device in a position wherein said inlet opening may be attached to an outlet of a system generating the gas stream.

References Cited
UNITED STATES PATENTS

| 1,966,280 | 7/1934 | Bingman | 261—116 X |
| 2,152,251 | 3/1939 | Gay | 261—116 X |
| 2,217,130 | 10/1940 | Niehart | 55—223 X |
| 2,387,345 | 10/1945 | Pearl | 55—223 X |
| 2,684,836 | 7/1954 | Arborgh et al. | |
| 2,696,275 | 12/1954 | Pring | 261—112 X |
| 3,009,687 | 11/1961 | Hendriks | 261—118 X |
| 3,034,771 | 5/1962 | Harris | 261—116 X |
| 3,057,605 | 10/1962 | Stone. | |
| 3,131,237 | 4/1964 | Collins. | |
| 3,141,910 | 7/1964 | Pearle | 261—108 |
| 3,181,287 | 5/1965 | Rabson | 261—116 X |
| 3,225,523 | 12/1965 | Wiebe | 261—116 X |
| 3,228,667 | 1/1966 | Jones et al. | 261—116 X |

FOREIGN PATENTS

| 559,651 | 10/1957 | Belgium. |
| 1,361,725 | 4/1964 | France. |
| 4,386 | 1874 | Great Britain. |
| 23,921 | 1910 | Great Britain. |

HARRY B. THORNTON, *Primary Examiner.*

D. TALBERT, *Assistant Examiner.*